United States Patent [19]

Cabrera et al.

[11] Patent Number: 5,362,512
[45] Date of Patent: Nov. 8, 1994

[54] LIQUID BREAD IMPROVERS

[75] Inventors: Jorge A. Cabrera, Voorschoten; Caesar W. Heeren, Schiedam, both of Netherlands

[73] Assignee: Van den Bergh Foods Co., Division of Conopco, Inc., Lisle, Ill.

[21] Appl. No.: 48,402

[22] Filed: Apr. 14, 1993

[30] Foreign Application Priority Data

Apr. 29, 1992 [EP] European Pat. Off. ........ 92201189.5

[51] Int. Cl.$^5$ ................... A21D 2/16; A21D 8/04; A23D 9/00
[52] U.S. Cl. .................... 426/601; 426/20; 426/27; 426/64; 426/553; 426/604; 426/606; 426/653
[58] Field of Search ............ 426/601, 604, 64, 20, 426/27, 653, 553, 606

[56]  References Cited

U.S. PATENT DOCUMENTS

| 2,815,286 | 12/1957 | Andre . | |
|---|---|---|---|
| 3,395,023 | 7/1968 | Haighton et al. . | |
| 3,914,452 | 10/1975 | Norris | 426/549 |
| 3,943,259 | 3/1976 | Norris | 425/24 |
| 4,234,606 | 11/1980 | Gawrilow . | |
| 4,335,157 | 6/1982 | Varvil | 426/653 |
| 4,469,710 | 9/1984 | Rielley et al. . | |
| 4,477,479 | 10/1984 | Jervis | 426/653 |
| 4,824,684 | 4/1989 | Barry et al. . | |
| 4,889,740 | 12/1989 | Price . | |
| 5,185,173 | 2/1993 | Bethke et al. | 426/653 |

FOREIGN PATENT DOCUMENTS

| 1025992 | 4/1966 | United Kingdom . |
|---|---|---|
| 1245489 | 9/1971 | United Kingdom . |
| 1382214 | 1/1975 | United Kingdom . |
| 1544499 | 4/1979 | United Kingdom . |
| 2208079 | 2/1989 | United Kingdom . |

OTHER PUBLICATIONS

Derwent Abstract of JP 53009351.
European Search Report in a corresponding European application No. 92201189.5 is enclosed.
Knightly, W. G., "Shortening Systems: Fats, Oils, and Surface-Active Agents—Present and Future". 6031 Cereal Chemistry. vol. 58 (1981) May-Jun., No. 3, pp. 171-174.
Derwent Abstract of JP 54-052741.
Derwent Abstract of JP 53-124517.
Abstract of JP 57-198046.
Derwent Abstract of EP 246 554.

Primary Examiner—Helen Pratt
Attorney, Agent, or Firm—Rimma Mitelman

[57] ABSTRACT

Liquid bread-improving compositions with improved stability that contain: 75-95 wt. % vegetable oil having an $N_2$ less than 2.0, 1-5 wt. % hydrogenated vegetable oil having a melting point between 60° and 70° C., 1-5 wt. % partly hydrogenated vegetable oil having a melting point between 35° and 45° C., 2-20 wt. % emulsifiers, at least including DATA-esters, 0-0.2 wt. % flavors, 0.1-1.0 wt. % bread-improving enzymes, and 0.1-0.5 wt. % oxidants. The oil present in a crystallized form has the crystal size less than 25 mm and the average particle size of all particles present in the composition is less than 50 mm.

8 Claims, No Drawings

LIQUID BREAD IMPROVERS

Liquid bread improvers have been developed due to their easy handling, pumping and metering bread-improving compositions were developed in the past. A prerequisite of such liquid bread improvers is that they should be fluid at temperatures of about 10°–30° C. and that they should be stable on storage at these temperatures and do not separate into two distinct phases, including a precipitate.

According to U.S. Pat. No. 3,943,259 fluid shortenings comprising 4–14 wt. % of soft mono- and diglycerides, 2–8 wt. % of ester emulsifiers, 0–8 wt. % of a solid stearin fraction and at least 40 wt. % of a liquid vegetable oil, fulfil the requirements mentioned above.

Although these known compositions have good storage properties, and do impart reasonable properties such as texture, specific volume or anti-staling to a dough or a baked product made from the dough, this product has the disadvantage that it becomes a paste after some period of storage at room temperature. Further at higher temperatures these products shows oil-exudation (about 10–15 wt %). We found that the above dough properties could be improved by the incorporation of bread improving enzymes into the compositions of this US patent. However, this incorporation of enzymes affected the storage properties of the composition according to U.S. Pat. No. 3,943,259 adversely.

We have studied how to overcome the storage stability problem and the problems of the incorporation of the enzymes. As a result we have found novel liquid bread-improving compositions containing bread-improving enzymes while the compositions remain stable for at least four months.

The liquid bread-improving compositions according to the invention comprise:

75–95 wt. % of a vegetable oil having an $N_{20} < 2.0$ ($N_{20}$ being the solid fat content measured by NMR pulse after stabilization);

1–5 wt. % of a hydrogenated vegetable oil having a melting point between 60° and 70° C.;

1–5 wt. % of a partly hydrogenated vegetable oil having a melting point between 35°–45° C.;

2–20 wt%, preferably 2–10 wt. % of emulsifiers, at least including diacetyl tartaric esters from saturated or unsaturated mono- and/or diglycerides (i.e. DATA esters), and optionally in combination with saturated and/or unsaturated mono- and diglycerides (i.e. Hymono); and/or calcium stearyl lactylate (i.e. CSL) and/or sodium stearyl lactylate (i.e. SSL);

0–0.2 wt. % of flavours;

0.1–0.5 wt. % of bread-improving enzymes;

0.1–1.0 wt%, preferably 0.1–0.5 wt. % of oxidants, the crystal size of the crystallized fat present in the composition being less than 25 $\mu$m, preferably less than 10 $\mu$m and the average particle size of the particles present in the composition being less than 50 $\mu$m.

The liquid vegetable oil having $N_{20} < 2.0$ may be chosen from any liquid vegetable oil meeting the N-requirement. Examples thereof are soybean oil, sunflower oil, safflower oil and maize oil. The use of soybean oil is preferred.

The hydrogenated vegetable oil having a melting point of 60–70° C. may be any hydrogenated vegetable oil meeting the melting point requirement. Examples thereof are hydrogenated soybean oil, in particular BO-65, hydrogenated rapeseed oil, hydrogenated sunflower oil or hydrogenated safflower oil. Preferred is the hydrogenated soybean oil.

The partly hydrogenated vegetable oil of melting point 35°–45° C. may also be any hydrogenated vegetable oil meeting the melting point requirement. Examples thereof are partly hydrogenated soybean oil, in particular Moldo oils, i.e. partly hydrogenated soybean oil of melting point 38°–42° C., partly hydrogenated rapeseed oil, partly hydrogenated sunflower oil, partly hydrogenated safflower oil or partly hydrogenated maize oil. It is emphasized here (and illustrated by the Examples) that the presence of this partly hydrogenated compound is essential for obtaining the desired stability of the end product.

Another important feature is that DATA esters (diacetyl tartaric esters from mono- and/or diglycerides) are present in the emulsifier composition. In addition to the DATA esters, other emulsifiers, such as mono- and/or diglycerides (i.e. Hymono), stearyl lactylates (both Ca- and Na-, thus CSL or SSL, respectively) can be present. We found that in particular a mixture of DATA esters and Hymono's in a weight ratio of 2–6 DATA: 1–4 Hymono gave excellent results.

The bread-improving enzyme may be any known enzyme having bread-improving properties. Examples thereof are amylase, xylanase, glucose oxidase, mannase, maltase or mixtures thereof.

The oxidant may be any known oxidant used in bread doughs, e.g. ascorbic acid or $KBrO_3$. A preference is expressed for the addition of ascorbic acid to the composition.

The conditions which have to be used during the preparation of our liquid bread improvers should be such that the crystal size of the crystallized fat in our compositions is less than 25 $\mu$m, preferably less than 10 $\mu$m, preferably less than 8 $\mu$m. These conditions can be fulfilled by a proper selection of process conditions, as will be pointed out hereinafter. Preferably, the amount of crystallized fat present in the composition should be 2–10 wt. % (calculated on the total composition).

The most preferred composition comprises:

80–90 wt. % of soybean oil;

2–4 wt. % of hardened soybean oil of melting point 65° C.;

2–4 wt. % of partly hardened soybean oil of melting point 40° C.;

6–8 wt. % of emulsifiers consisting of 60–80 wt. % of DATA esters and 40–20 wt. % of Hymono's;

0.1–0.25 wt. % of enzymes;

0.1–0.25 wt. % of ascorbic acid, the crystal size of the crystallized fat being 6–8 $\mu$m and the average particle size of the particles present being 30–40 $\mu$m.

As a matter of fact, the average particle size of the particles present is mainly determined by the particle size of the crystallized fat and the particle size o[the enzymes.

Liquid bread improvers having the required properties are obtained by a process consisting of the following process steps:

(1) the fat components are mixed and melted at temperatures between 50° and 75° C.;

(2) the molten fat mixture is kneaded and worked through a Votator usually consisting of an A- and a C-unit (but A-C-B- is also possible), while the mixture is cooled to 20°–32° C.;

(3) the cooled mixture from (2) is fluidized with mild stirring for at least 1 hour, preferably at least 10 hours at a temperature of 25°–35° C.;

(4) the enzyme(s) and the oxidant(s) are added to the mixture resulting from (3);

(5) the mixture from (4) is stirred for 30 minutes - 4 hours at ambient temperature.

In this process, steps (2) and (3) are essential for obtaining the desired crystal size of the fat crystals and the desired amount of fat crystals in the composition. In particular, the temperature and residence time are important.

The enzymes can only be added at low temperatures. Therefore, the enzymes are added in step (4). The stirring in step (5) is required for obtaining the desired average size for the particles present in the composition.

We found that the storage stability of our novel compositions was at least 4 months while the storage stability of similar compositions, but without the partly hydrogenated fat component, was less than 2 months.

EXAMPLES AND COMPARATIVE EXAMPLES

1. The fat components mentioned in Table I were mixed and melted at 70° C.;
2. The mixture was passed through a Votator (A–C) and cooled to 25° C.;
3. The cooled mixture was fluidized in a stirrer tank at 30° C., during which fluidization it was slowly stirred for 16 hours;
4. The enzymes and ascorbic acid were added to the mixture;
5. The mixture was stirred for 2 hours at ambient temperature.

The storage stability of the end products was observed. Table I indicates the times when a precipitate could be observed.

TABLE I

| Component | Example 1 | Example 2 |
|---|---|---|
| % soybean oil ($N_{20} = 0$) | 86.7 wt % | 86.7 wt % |
| % h. Bo-65 | 2.5 | 5.0 |
| % MOLDO BO-40 | 2.5 | — |
| % emulsifier, comprising DATA-esters and monoglyceride | 8.0 | 8.0 |
| % bread improving enzymes | 0.15 | 0.15 |
| ascorbic acid | 0.15 | 0.15 |
| storage stability | 4 months | 2 months |

We claim:

1. Liquid bread-improving composition comprising:
   75–95 wt. % of a vegetable oil having an $N_{20} < 2.0$;
   1–5 wt. % of a hydrogenated vegetable oil having a melting point between 60° and 70° C.; 1–5% of a partly hydrogenated vegetable oil having a melting point between 35°–45° C.;
   2–20 wt. % of emulsifiers, at least including diacetyl tartaric esters from saturated or unsaturated mono- and/or diglycerides;
   0–0.2 wt. % of flavors;
   0.1–0.5 wt. % of bread-improving enzymes;
   0.1–1.0 wt. % of oxidants,
   wherein the oil present in a crystallized form has the crystal size of less than 25 μm and the average particle size of all particles present in the composition is less than 50 μm.

2. Liquid bread improver according to claim 1, wherein the vegetable oil having $N_{20} < 2.0$ is soybean oil.

3. Liquid bread improver according to claim 1, wherein the hydrogenated vegetable oil is fully hydrogenated soybean oil.

4. Liquid bread improver according to claim 1, wherein the partly hydrogenated vegetable oil is a partly hydrogenated soybean oil of melting point 38°–42° C.

5. Liquid bread improver according to claim 1, wherein the emulsifier comprises a blend of diacetyltartaric esters from mono- and/or diglycerides and monoglycerides with a ratio of diacetyltartaric esters from mono- and/or diglycerides: monoglyceride of 6:1 - 1:2.

6. Liquid bread improver according to claim 1, wherein the bread-improving enzyme is chosen from the group consisting of amylase, xylanase, glucose oxidase, mannase, maltase and mixtures thereof.

7. Liquid bread improver according to claim 1, wherein the oxidant is ascorbic acid.

8. Liquid bread improver according to claim 1, wherein the amount of crystallized fat having a crystal size of less than 25 μm present in the composition is 2–10 wt. %.

* * * * *